No. 841,954. PATENTED JAN. 22, 1907.
S. FRANK.
APPARATUS FOR MANUFACTURING TUBES AND THE LIKE.
APPLICATION FILED SEPT. 22, 1904.
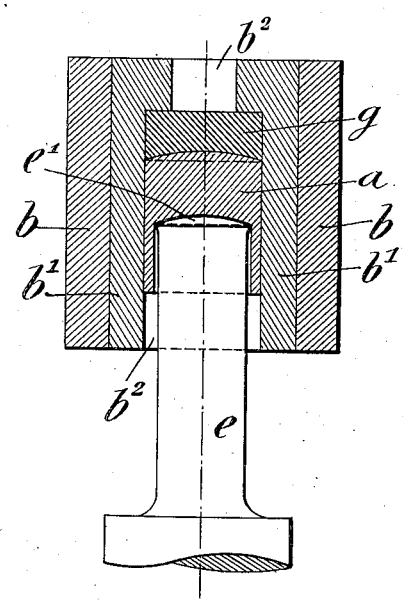

UNITED STATES PATENT OFFICE.

SALOMON FRANK, OF FRANKFORT-ON-THE-MAIN, GERMANY.

APPARATUS FOR MANUFACTURING TUBES AND THE LIKE.

No. 841,954.  Specification of Letters Patent.  Patented Jan. 22, 1907.

Application filed September 22, 1904. Serial No. 225,423.

*To all whom it may concern:*

Be it known that I, SALOMON FRANK, a citizen of the Empire of Germany, residing in Frankfort-on-the-Main, in said Empire, have invented certain new and useful Improvements in Apparatus for Manufacturing Tubes and the Like, of which the following is a specification.

This invention aims to provide an apparatus by means of which tubes and similar articles may be very readily and efficiently manufactured from semihard metals merely by the application of pressure and without the use of heat.

A further object of the invention is to provide an apparatus for this purpose in which the pressure is so applied to the block of metal from which the tube is to be formed that the pressure required for obtaining the "flow" of the metal without the application of heat is reduced to a minimum, the apparatus being sufficiently strong to resist the pressure in question without undergoing any deformation.

The accompanying drawing illustrates in vertical section an apparatus constructed in accordance with the invention.

In the drawing, $b$ denotes a press-block which is preferably cylindrical and which is provided with an interior bore. Within said bore is fixed in any approved manner a bushing $b'$ of hard metal, said bushing being provided with a bore $b^2$, passing therethrough. The bushing $b'$ is counterbored, so that one end of its bore is of greater diameter than the other end. Seated in the part of the bore which is of greater diameter and abutting against the shoulder formed in the bore is a bottom block $g$, having a slightly concave surface facing toward the larger portion of the bore $b^2$, in which the formation of the tube takes place.

$e$ denotes a plunger which is adapted to be forced into the bore $b^2$ and toward the bottom block. Said plunger is of considerably less diameter than the bore of the press-block bushing, the difference in diameter being equal to the thickness of the tube which it is desired to manufacture. The forward working end $e'$ of the plunger $e$ is made convex, its convexity conforming exactly to the concavity of the bottom block. Furthermore, the working end of said plunger is of greater diameter than the portion at the rear of said end, said plunger being cut away sharply and reduced in diameter immediately at the rear of its enlarged end.

In practice a block $a$ of the material from which the tube is to be made is placed within the bore $b^2$, abutting against the bottom block $g$. It is important that this block of metal fit snugly within said bore—that is to say, the diameter of said block must correspond to the diameter of said bore.

When the block has been placed in position, as indicated, the plunger $e$ is forced inwardly by any suitable means into the bore $b^2$ and against the block of metal. The action of the plunger is such as to cause the compression of the metal between the enlarged convex working end of the plunger and the concave surface of the bottom block, whereby the metal is forced laterally to either side of said plunger and bottom block and rearwardly out of the bore. The edge of the enlarged working end of the plunger forms the opening within the tube, the inner surface of the tube not being in contact with the plunger except at said edge. By this arrangement there is no friction created between the inner surface of the tube and the plunger. The only friction which is produced is between the outer surface of the tube and the bushing $b'$; but this is inconsiderable and the metal readily slides along the inner surface of said bushing toward the outer end of the bore.

By the arrangement described the pressure of the plunger is so applied to the block of metal that the friction between the metal acted upon and the bore of the press-block is reduced to a minimum, and consequently the pressure required for the formation of tubes in accordance with the invention is also reduced to a minimum. Further, by the arrangement described metal tubes may be very quickly manufactured without the application of heat.

Having thus described my invention, I claim as new and desire to secure by Letters Patent—

In an apparatus for manufacturing metal tubes without the application of heat, the combination of a press-block having a bore, a bottom block fixed in said bore and provided with a slightly concave working surface, and a plunger movable in said bore and provided with an enlarged convex working end, the convexity of which corresponds to the concavity of said bottom block, said plunger being cut away sharply and reduced in diameter immediately at the rear of its forward edge which forms the opening or bore of the tube.

In testimony whereof I have signed this specification in the presence of two subscribing witnesses.

SALOMON FRANK.

Witnesses:
JEAN GRUND,
CARL GRUND.